UNITED STATES PATENT OFFICE.

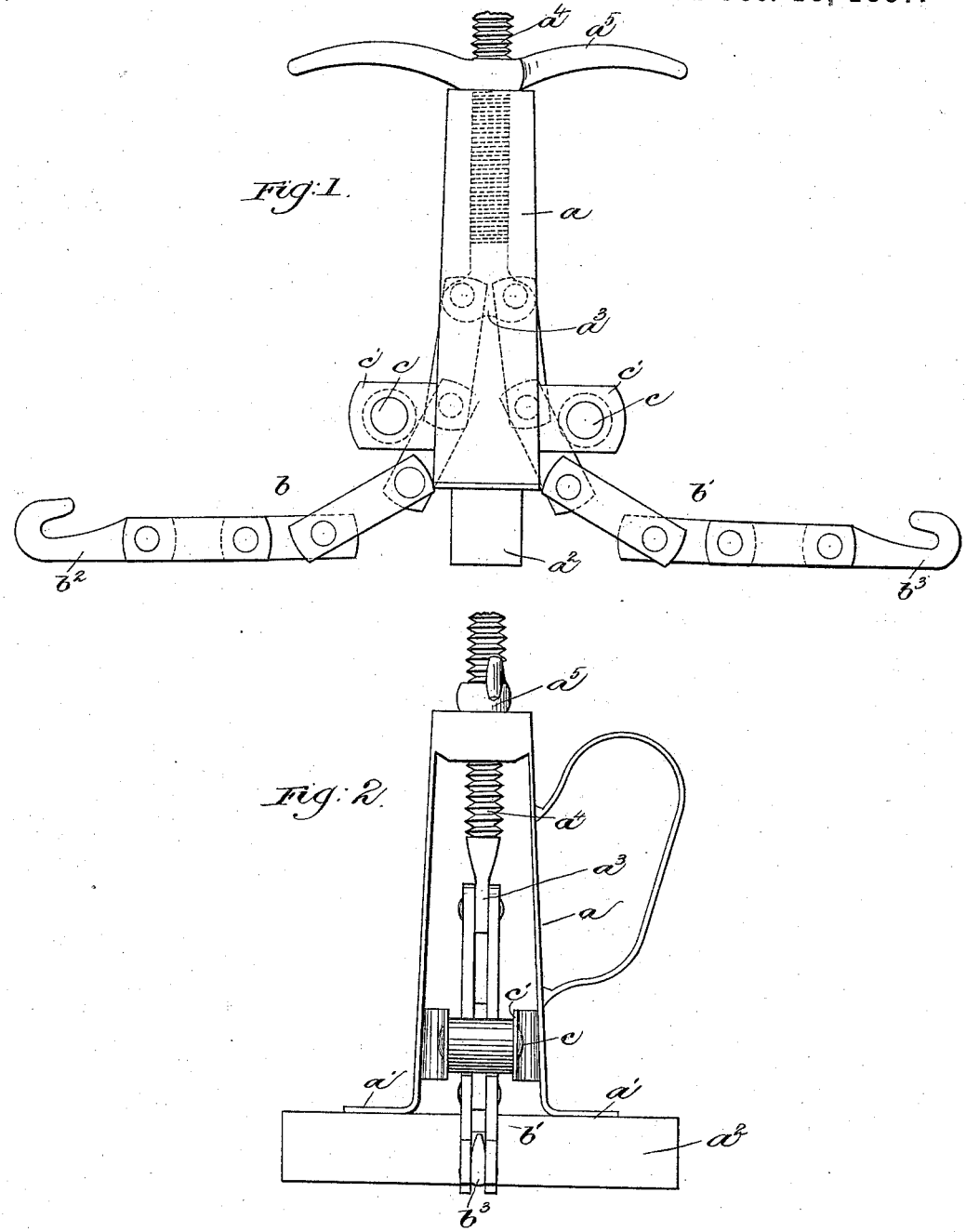

PETER SABOURIN, OF WEST BERKSHIRE, VERMONT.

LOAD-BINDER.

SPECIFICATION forming part of Letters Patent No. 371,792, dated October 18, 1887.

Application filed January 25, 1887. Serial No. 225,436. (No model.)

*To all whom it may concern:*

Be it known that I, PETER SABOURIN, of West Berkshire, county of Franklin, and State of Vermont, have invented an Improvement in Load-Binders, of which the following description, in connection with the accompanying drawings, is a specification, like letters on the drawings representing like parts.

This invention has for its object to construct a load binder especially adapted for lumbermen's use, whereby a binding cord or chain employed to bind a load of wood, hay, straw, or other material may be very easily secured and drawn taut.

The invention consists in the combination, with two drawing or tightening chains or cords, of a carrier, to which the said chains or cords are attached, and means for moving the said carrier and locking it in any desired position by the operator. The carrier in this instance is formed as a screw-threaded rod or bar having an enlarged flattened head, said rod moving freely in a suitable supporting-frame, and a hand-lever is employed, which turns on the screw-threaded rod, and bearing against the upper side of the supporting-frame in its rotation, raises or lowers the carrier, thereby tightening or loosening the drawing-chains.

The device is preferably supplied with a suitable base-block or foundation-plate, upon which the supporting-frame is placed, and also with a suitable handle.

Figure 1 shows in side elevation a load-binder embodying this invention, and Fig. 2 an edge view thereof.

The supporting-frame $a$, of pyramidal shape, has feet $a'$, bearing upon a base-block, $a^2$, the said frame $a$ being preferably open to contain a carrier, (herein shown as a screw-threaded rod or bar, $a^4$,) having an enlarged flattened head, $a^3$, and passing vertically through a hole cut in the top of the frame $a$.

The screw-threaded bar is supported by a hand-lever, $a^5$, which is screw-threaded and turned upon the bar $a^4$, the said hand-lever $a^5$ being held down upon the top of the frame $a$ by the weight of the carrier and its attached parts. The screw-threaded rod $a^4$, thus supported by the hand-lever, will be raised and lowered by rotation of the said hand-lever.

Two chains, $b\ b'$, (herein shown as composed of connected links) are secured to the bar $a^3$, passing downward and leading from the opposite sides of the lower portion of the frame $a$, the said chains having secured to their outer ends suitable engaging-hooks, $b^2\ b^3$.

Instead of employing chains, as $b'\ b'$, cords or any equivalents may be employed.

The opposite ends of a binding-cord surrounding a load of wood, hay, straw, or it may be a bale of hay or some other object to be bound together, are made fast to the engaging-hooks $b^2\ b^3$ of the chains, the base-block $a^2$, upon which the frame $a$ rests at such time, resting upon or against the load or other object. The hand-lever $a^5$ is then rotated, causing the screw-threaded bar $a^4$ to rise, thereby drawing the engaging ends $b^2\ b^3$ of the cords or chains toward each other to tighten the binding-cord. The cords or chains bear against friction-rolls mounted freely upon rods $c$, secured within the metallic loops $c'$ at each side of the frame $a$, so that when the engaging-hooks $b^2\ b^3$ are moved toward each other by a vertically-moving carrier little resistance will be offered.

I claim—

1. In a load-binder, the rigid supporting-frame $a$, loops or arms $c'\ c'$, projecting from it, combined with two drawing chains or cords, and a vertically-moving carrier, to which the said chains or cords are attached, and means for moving the said carrier vertically.

2. In a load-binder, the rigid supporting-frame and vertically-moving carrier within it, combined with the drawing chains or cords connected with the vertically-moving carrier, and means for moving the said carrier, substantially as described.

3. In a load-binder, the rigid supporting-frame $a$ and base-block $a^2$, upon which it rests, the projecting loops or arms $c'\ c'$ upon each side of the supporting-frame, combined with drawing chains or cords, a vertically-moving carrier or bar, to which the said chains or cords are attached, and a hand-lever for moving the said carrier or bar, substantially as described.

4. The rigid supporting-frame $a$, laterally-projecting loops or arms $c'\ c'$, and the drawing-chains, combined with the screw-threaded carrier or bar, to which the said drawing-chains are connected, and a hand-lever turning upon the screw-threaded portion of the carrier or bar against the supporting-frame for raising and lowering the carrier, substantially as described.

5. The rigid supporting-frame $a$, its loops or arms $c'\ c'$, rods $c\ c$, and friction-rollers, combined with the cords or chains moving against the friction-rollers, a carrier, to which the said drawing-chains are attached, and means for moving said carrier, substantially as described.

In testimony whereof I have signed my name to this specification in the presence of two subscribing witnesses.

PETER SABOURIN.

Witnesses:
   CHARLES R. ELRICK,
   P. S. EWINS.